United States Patent [19]

Georgopoulos

[11] Patent Number: 5,418,084

[45] Date of Patent: May 23, 1995

[54] ELECTROCHEMICAL CELL HAVING A SAFETY VENT CLOSURE

[75] Inventor: Philip Georgopoulos, Westlake, Ohio

[73] Assignee: Eveready Battery Company, Inc., Del.

[21] Appl. No.: 979,961

[22] Filed: Nov. 23, 1992

[51] Int. Cl.⁶ ............................................. H01M 2/12
[52] U.S. Cl. ........................................ 429/54; 429/55; 429/56
[58] Field of Search ............................... 429/56, 54, 55

[56] References Cited

U.S. PATENT DOCUMENTS

| | | | |
|---|---|---|---|
| 3,218,197 | 11/1965 | Carmichael et al. | 429/56 |
| 3,436,273 | 4/1969 | Aratzmuller | 136/6 |
| 3,537,903 | 12/1968 | Braun | 429/54 |
| 4,329,405 | 5/1982 | Zupancic | 429/54 |
| 4,486,514 | 12/1984 | Chaney | 429/56 |

FOREIGN PATENT DOCUMENTS

| | | | |
|---|---|---|---|
| 881814 | 7/1949 | Germany | 429/54 |
| 305330 | 2/1929 | United Kingdom | 429/54 |

*Primary Examiner*—David B. Springer
*Attorney, Agent, or Firm*—Robert W. Welsh

[57] ABSTRACT

An electrochemical cell having a vent orifice defined in the cover of the cell and a conductive spring member is employed to electrically connect one of the electrodes of the cell to the cover so as to adapt the cover as the terminal for the electrode.

23 Claims, 2 Drawing Sheets

ELECTROCHEMICAL CELL HAVING A SAFETY VENT CLOSURE

TECHNICAL FIELD

This invention relates to a safety, non-resealable vent closure using spring contact means for galvanic cells, such as nonaqueous cells employing liquid cathode materials, such as liquid oxyhalides, and solid cathode materials, such as $FeS_2$.

BACKGROUND ART

Galvanic cells may generate large quantities of gas under certain conditions during use. Since many such cells are required to be tightly sealed in order to prevent loss of electrolyte by leakage, high internal gas pressures may develop. Such pressures may cause leakage, bulging or possible rupture of the cell's container under abusive conditions if not properly vented.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

With the continuing development of portable electrically powered devices such as tape recorders and playback machines, radio transmitters and receivers, and the like, new types of reliable, long service life cells or batteries have been developed. These newly developed electrochemical cell systems provide a long service life by utilizing highly reactive anode materials such as lithium, sodium and the like, in conjunction with high energy density cathode materials.

U.S. Pat. No. 4,400,453 discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 63rd Edition, The CRC Press, Inc., Boca Raton, Fla., 1982-1983. For example, such nonaqueous cathode materials would include sulfuryl chloride, thionyl chloride, phosphorus oxychloride, thionyl bromide, chromyl chloride, vanadyl tribromide, chromyl chloride, vanadyl tribromide and selenium oxychloride.

Another class of liquid cathode materials would be the halides of an element of Group IV to Group VI of the Periodic Table. For example, such nonaqueous cathode materials would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, tin bromide trichloride, tin dibromide dichloride and tin tribromide chloride.

One possible disadvantage in the use of oxyhalide and halide liquid cathode nonaqueous cells is that it may be possible that, during storage or use, some of the oxyhalide, halide or their reaction products may escape from the cell. This escape of liquids and/or gases could cause damage to the device employing the cell or to the surface of a compartment or shelf where the cell is stored. On the other hand, if the seal of the cell is effectively permanently secured, then it is possible that the build-up of internal pressure within the cell could cause the cell's container to rupture which may cause property and/or bodily damage. To prevent rupture of the cell's container from possible internal pressure build-up caused under abusive conditions, such as charging and exposure to a high temperature environment, it is necessary to vent the cell at some predetermined pressure.

To overcome the potential problem of leakage of liquid cell components between the vent orifice and the member closing the vent orifice, U.S. Pat. No. 4,529,673, discloses the use of a corrosion-resistant material disposed at the interface of the wall defining a vent orifice and a force-fitted member. However, during storage and discharge, some electrolyte may at times leak at the interface of the wall defining the vent orifice and the corrosion-resistant material.

U.S. Pat. No. 4,931,368 discloses an electrochemical cell having a cell housing having a vent liner containment section that comprises a sealing well having a bottom disposed toward the interior of the cell, an orifice in the sealing well and a support ledge at the bottom of the sealing well; a vent liner having a vent liner orifice disposed within the sealing well so that an end of the vent liner abuts the support ledge, the orifice in the sealing well and the vent liner orifice providing a path from the interior of the cell to the atmosphere; and a seal member force-fitted within the vent liner, wherein the vent liner and the seal member are adapted so that the seal member will be at least partially expelled from the vent orifice at a predetermined internal gas pressure within the cell.

In U.S. Pat. No. 4,592,970 a cell is disclosed that is similar to the cell in U.S. Pat. No. 4,529,673 except that a sealant is disposed at the interface of the wall defining the vent orifice and the liner so as to prevent any electrolyte from leaking at the interface of these components.

U.S. Pat. No. 4,855,195 discloses an electrochemical cell comprising (a) an electrode assembly containing a positive and negative electrode; (b) a housing containing the electrode assembly, and containing a means for providing a terminal for one of the electrodes; (c) a cover assembly containing a means for providing a terminal opposite the terminal of the housing to thereby establish an electrical circuit in the cell; and (d) a current collector member disposed in the circuit and in physical contact with one of the electrodes; said collector comprised of a shape-memory alloy, and having a base portion and a plurality of legs extending from the base portion; wherein the collector provides a means for disconnecting the electrical circuit in the cell when the internal temperature of the cell rises.

U.S. Pat. No. 4,529,675 discloses a rechargeable electrochemical cell comprising: a sealed cylindrical container having first and second ends; an electrode assembly disposed in said container and spirally would about an axis, said assembly comprising first and second electrodes with a separator disposed therebetween, said first electrode having an offset edge segment extending at said first end in a first axial direction axially beyond said second electrode; an electrolyte disposed within said container and infiltrating said first and second electrodes and said separator; a current collector disposed in said container axially adjacent said offset segment of said first electrode, said collector having a base portion spaced from said offset segment and in electrically conductive contact with said container, said collector further having a plurality of deflectable tabs each projecting from said base portion and into electrical contact with said offset segment at a plurality of locations along said offset segment, said tabs being in a deflected condition to exert a contact force on said offset segment and thereby effect electrical conductive engagement between said tabs and said offset segment at each of said locations.

It is, therefore, an important object of this invention to provide a spring contact means for a safety vent closure for electrochemical cells that will vent at a predictable low pressure and not before.

It is another object of this invention to provide a spring contact means for a safety vent closure for cylindrical cells employing, for example, liquid oxyhalides and solid cathode materials such as $FeS_2$ or $MnO_2$, as the active cathodic material.

It is another object of this invention to provide a spring contact means for a safety non-resealable vent closure for nonaqueous cells that is inexpensive to manufacture and easy to assemble.

The foregoing and additional objects will become fully apparent from the following description and the accompanying drawings.

DISCLOSURE OF THE INVENTION

The invention relates to an electrochemical cell comprising:
(a) an electrode assembly containing a first electrode and a second electrode of opposite polarity;
(b) a housing containing said electrode assembly and a means for providing a terminal for the first electrode;
(c) a cover assembly for said housing, said cover assembly comprising a cover member electrically insulated from the housing and containing at least one vent orifice defined by an extended wall of said cover extending into the housing and means for closing said vent orifice;
(d) a conductive spring comprising a folded elongated member in which the surface defines at least two openings that are axially aligned and two of said openings spaced apart to form spring means of the folded elongated member and having the extended wall forming the vent orifice of the cover projected through said openings in the folded conductive spring and making electrical contact with said cover member; and
(e) said second electrode electrically contacting the conductive spring thereby adapting the cover as the terminal for the second electrode.

In a preferred embodiment of the invention, the surface of the elongated member defines three spaced apart openings comprising a first central opening, a second opening located to one side of the first central opening and a third central opening located to the opposite side of the first central opening. Preferably, the central opening should be larger than the other openings. The surface defining the second opening is folded so as to axially align the second opening with the first opening and the surface defining the third opening is folded so as to axially align the second opening with the third opening and said surface defining the second opening contacting the surface defining the third opening. The folded elongated member has three axially aligned openings with two openings in contact relationship and said two openings spaced apart from the third opening. This spring assembly can be press-fitted over the extended wall of the cover defining the vent orifice. Preferably, the opening defined by the folded elongated member will be in frictional contact with the extended wall of the cover so as to make good physical and electrical contact to the cover. The second electrode electrically contacts the folded elongated member which in its folded condition provides a spring means between the surfaces of the spring member that defines the openings. Thus when the second electrode has extended conductive leads or conductive sheets, the folded member will act as a spring and exert pressure contact against the extended leads or sheet and the cover of the cell thereby adapting the cover of the cell as the terminal for the second electrode.

The folded elongated member can be made of any flexible conductive material that can be folded and superimposed to align openings in the member that are axially spaced apart so that the overall assembly provides a spring means in which there will be resistance to any additional compression of the folded member. This arrangement will provide a good spring means for electrically connecting the second electrode to the cover of the cell. Suitable materials for the conductive elongated member are those which are chemically resistant to the cell environment such as stainless steel, cold rolled steel, nickel-plated stainless steel and nickel-plated cold rolled steel.

Preferably, a liner defining a central orifice is disposed adjacent the inner wall of the cover defining the vent opening and a seal member, such as a sphere, is force fitted within the orifice of the liner to provide a normally fluid-tight seal for the vent opening in the cell. At least one of the seal member and liner is resiliently deformable so that said seal member will be at least partially expelled from the vent opening when the internal pressure exceeds a predetermined level. Preferably, the bottom edge portion of the wall of the cover that defines the vent opening could extend inwardly to provide a flange that could provide a seat for the liner.

Preferably, the housing of the cell comprises a container having a closed bottom and an upstanding wall defining an opening which is closed by a cover and wherein the vent orifice is disposed in the cover. The vent orifice could be formed as an integral part of the cover, or could be a separate component having an extended wall defining the vent orifice and such component could be secured to the cover of the cell.

Preferably, the liner should be a corrosion-resistant liner and not form an integral part of the force-fitted member and thus will not effectively alter the vent release pressure of the force-fitted seal member from the liner.

Suitable corrosion-resistant materials for the liner for use in the invention include nylon, polyethylene, polypropylene, polytetrafluoroethylene, fluorinated ethylene-propylene polymer, perfluoroalkoxy polymer, ethylene-fluorinated ethylene polymer, glasses and metals, depending on the cell system. In some cell applications, it would be preferable to use a resiliently deformable liner. It is understood that the selection of the proper material will depend on the electrochemical system employed in order to insure its corrosion resistance.

If desired, a layer of sealant is disposed between the wall of the orifice and the liner to prevent leakage of the electrolyte at this interface. Many electrolytes have a propensity for creepage along component parts of a cell and eventually may find a path to the outside of the cell. Electrolyte leakage not only reduces the capacity of the cell but renders the cell unmarketable in the conventional retail trade. Suitable sealant materials for use in this invention are asphalt, wax such as halocarbon wax which is a saturated low-molecular weight polymer of chlorotrifluoroethylene having the general formula: $-(CH_2CFCl)_n-$, epoxy or any material which is resistant to moisture, has reasonable adhesion to the cell's housing and/or the liner, is chemically resistant to the cell's components, and can be easily applied. The sealant layer can be applied to the wall defining the orifice and/or the liner prior to placing the liner adjacent the wall of the orifice.

As used herein, the force-fitted member could be made of metals, glass or ceramics but could be resiliently deformable and made of a material or coated with a material that is chemically resistant to the cell's components, particularly the cell's liquid components. If the force-fitted member is resiliently deformable, the material of which it is made can be selected from the group consisting of polytetrafluoroethylene, fluorinated ethylene-propylene copolymer, perfluoroalkoxyethylene polymer, ethylene-tetrafluorethylene copolymer and the like. When the deformable material forming the force-fitted member is to be coated with a chemically inert material, the said deformable material can be selected from the group consisting of nylon, hard rubber and the like. Suitable materials for use in this invention but not suitable for some of the oxyhalide cell systems are nylon, polypropylene, polycarbonate, acrylic polymers and the like. Preferably, the force-fitted member should have a smooth spherical configuration and the inner surface of the liner should be substantially smooth. For cells employing solid cathode materials and organic electrolytes, such as Li/FeS$_2$ cells, the force-fitted member should preferably be made of glass.

The safety vent closure of this invention using a force-fitted seal member can be made to vent at any predetermined pressure build-up within the cell by regulating the size of the vent opening with respect to the size of the force-fitted member, the material of which the force-fitted member is made, and the shapes of the vent opening and the force-fitted member. The force-fitted member can be inserted rapidly into the orifice with a minimum of force to attain a reliable and predictable safety vent closure. The use of a controlled height dead-stop ram to insert the force-fitted member would be most desirable for automatic assembly operations.

Any combination of positive and negative electrodes suitable to provide an electrical circuit in the cell can be used in the cells of this invention. Examples of suitable combinations are a stacked assembly, plate assembly, bobbin type assembly, and spirally wound assembly.

The electrode assembly used in the cells of this invention is preferably a spirally wound electrode assembly. Typically, such an assembly has a negative electrode strip comprising an anode material and a positive electrode strip comprising a cathode material separated by a separator strip. Useful anode materials are consumable metals, such as aluminum, zinc, the alkali metals, alkaline earth metals, alloys of alkali metals and alkaline earth metals, and alkali metal-intercalated carbon or graphite materials. Preferred anode materials for nonaqueous electrolyte systems include aluminum, lithium, sodium, calcium and lithiated carbon. Preferably, the anode material for such systems is lithium because it is a ductile soft metal and possesses the highest energy-to-weight ratio of the group of suitable anode metals. Lithium can be utilized as a strip or can be applied to a suitable carrier. After being formed into the strip, the electrode will typically have an anode collector portion extending on one edge of the strip.

Suitable solid active cathode materials are electrochemically reducible materials. Such materials include natural or synthetic iron sulfides such as FeS$_2$ and FeS, manganese oxides such as MnO$_2$, carbon fluorides such as $(CF_x)_n$ or $(C_2F)_n$, V$_2$O$_5$, WO$_3$, MoO$_3$, MoS$_2$, lead oxides, cobalt oxides, copper oxides, copper sulfides, In$_2$S$_3$, NiS, Ag$_2$CrO$_4$, Ag$_3$PO$_4$, transition metal sulfides such as TiS$_2$, transition metal polysulfides, lithiated metal oxides and sulfides such as lithium cobalt oxides, lithium nickel cobalt oxides, lithium manganese oxides, Li$_x$TiS$_2$, Li$_x$FeS$_2$ and the like, and mixtures thereof. By "active cathode" is meant the material being reduced in the electrochemical reaction. The active cathode material is formed into the positive electrode by mixing the active cathode material with an amount of a suitable conductive material such as carbon, if needed, and an amount of a suitable binder. The mixture can then be formed into a strip material or pressed, impregnated or coated onto a suitable carrier such as foil or expanded metal. After being formed into the strip, the electrode will typically have a cathode collector portion extending on one edge of the strip.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition, The CRC Press Inc., Boca Raton, Fla., 1982–1983. Another suitable cathode material would be liquid sulfur dioxide.

Separator materials useful in this invention are materials which are electrically nonconductive but ionically conductive and are porous to allow the electrolyte to contact both electrodes. Examples of suitable separator materials are paper, fibrous or microporous polypropylene or polyethylene and glass fiber mats.

The spirally wound electrode assembly can be prepared by winding the separators, negative electrode, and positive electrode together so that the cathode collector protrudes from one end of the assembly while the anode collector extends from the other end of the assembly.

Suitable electrolytes for use in the cells of this invention can be aqueous or nonaqueous. Nonaqueous electrolytes can employ organic or inorganic solvents containing a conductive solute. Suitable organic solvents include tetrahydrofuran (THF), dioxolane, dimethoxyethane (DME), dimethyl isoxazole (DMI), 3-methyl-2-oxazolidone, diethyl carbonate (DEC), propylene carbonate, ethylene carbonate, ethylene glycol sulfite (EGS), dioxane, dimethyl sulfite (DMS), or the like and mixtures thereof.

Suitable salts include: MCF$_3$SO$_3$, M(CF$_3$SO$_2$)$_3$C, M(CF$_3$SO$_2$)$_2$CH, M(CF$_3$SO$_2$)$_2$N, MSCN, MBF$_4$, MClO$_4$ and MM'F$_6$ wherein M is lithium, sodium or potassium, and M' is phosphorus, arsenic or antimony.

The particular salt selected is compatible and non-reactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5M of the salt will be sufficient. An example of a preferred electrolyte is a mixture of dioxolane, 3-methyl-2-oxazolidone, and dimethoxyethane, and $LiCF_3SO_3$.

The housing of the cells of this invention is comprised of an electrically conductive material such as metal. It contains a means for providing a terminal for one of the electrodes. Preferably, the housing has an open end and a closed end and is cylindrical. The housing itself can contact one of the electrodes to provide a terminal. The cover assembly for the housing has the folded spring member of the invention for providing electrical contact to the opposite polarity electrode of the cell so as to adapt the cover as the second terminal of the cell. Preferably, the cover assembly further comprises a means for sealing and insulating the cover assembly from the cell housing and a seal-vent assembly including a means for venting the cell.

The present invention will become more apparent from the following description thereof when considered together with the accompanying drawing which is set forth as being exemplary of embodiments of the present invention and is not intended in any way to be limitative thereof.

DESCRIPTION OF THE PREFERRED EMBODIMENTS

Figure 1:
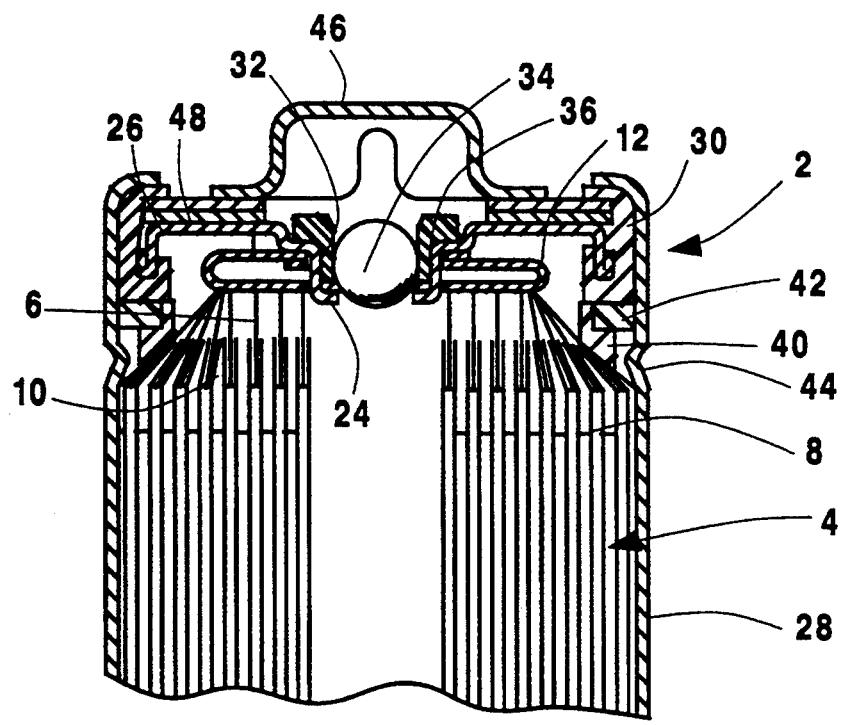
FIG. 1 is a vertical cross-sectional view of the upper portion of an electrochemical cell made in accordance with the present invention and employing a spirally wound electrode assembly and a spring contact means in accordance with this invention.
Figure 3:
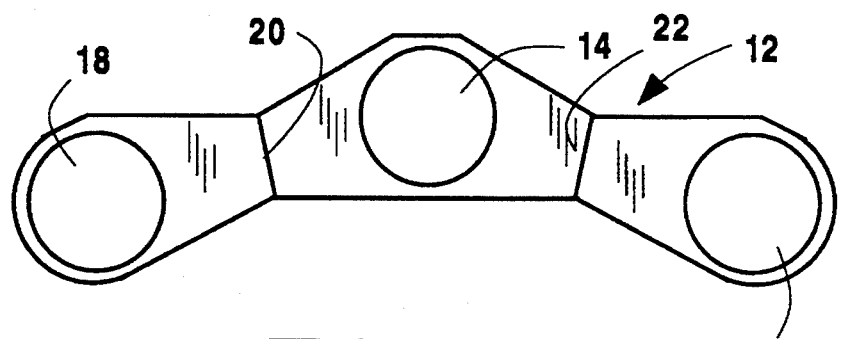
FIG. 3 is a plan view of a conductive elongated member prior to being folded into a spring contact means in accordance with this invention.
Figure 4:
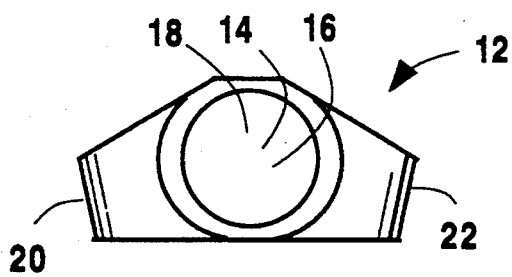
FIG. 4 is a plan view of the conductive elongated member of FIG. 3 with the tip segments folded.
Figure 5:
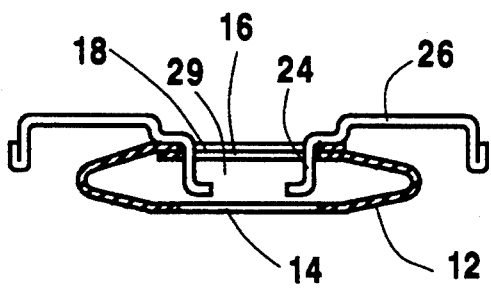
FIG. 5 is a side elevation view, partially in section, of the folded elongated member of FIG. 4 press-fitted over an extended central wall of a cover for a cell.

Referring to FIG. 1, an electrochemical cell 2 is shown having a spirally wound electrode assembly 4 prepared by superimposing and overlapping a first electrode strip 6 onto a second electrode strip 8 with an insulating separator 10 extending between electrode strip 6 and electrode strip 8. The edges of electrode strip 6 extend at the top end of the cell 2 to contact conductive folded member 12 made of a spring material. As shown in FIG. 3, conductive spring member 12 comprises a flat member defining a central opening 14, a first side opening 16 and a second side opening 18. Central opening 14 is preferably larger than side openings 16 and 18. As shown in FIGS. 3 and 4, conductive spring member 12 is folded along lines 20–22 so that openings 14, 16 and 18 are axially aligned and two of which are spaced apart. FIG. 5 shows the folded spring member 12 of FIG. 4 press-fitted onto an extended wall 24 of cover 26 and said extended wall defining a vent opening 29. Conductive spring member 12 makes physical and electrical contact with cover 26 so that when first electrode strip 6 electrically contacts conductive spring member 12, cover 26 is adapted as the terminal for first electrode strip 6. As also shown in FIG. 1, conductive cover 26 is sealed to the cell's container 28 and insulated from container 28 by gasket 30. Cover 26 has a well 32 to accommodate a seal-vent member 34. A liner 36 is disposed within well 32. During assembly, seal-vent member 34 is forced into liner 36 thereby forcing liner 36 outwardly against the wall 24 of cover 26 to provide an interference fit between wall 24 and liner 36. This will secure the liner in place even under abuse conditions of the cell and thereby prevent premature venting of the cell. This cell is assembled by placing the spirally wound electrode assembly 4 into the conductive container 28. An insulating cone 40 is then placed on top of the spirally wound electrode assembly 4 followed by a ring support 42 placed on cone 40 above a bead 44 in the container 28. As stated above, insulating gasket 30 is employed to provide a fluid- and, if required, a gas-tight seal for the cell. A terminal member 46 is placed on top of and secured to the conductive cover 26 via conductive member 48 so that terminal 46 serves as a terminal for electrode strip 6. If desired, conductive member 48 could include a positive temperature coefficient (PTC) device employed to break the internal circuit to the cover 26 under abuse conditions. For example, heat generated in the cell could cause the PTC device to undergo a large increase in resistance which interrupts the internal circuit of the cell.

Although not shown, electrode strip 8 extends at the bottom of the cell and electronically contacts the cell's container 28 thereby adapting the container 28 as the terminal for electrode strip 8. In the arrangement of FIG. 1, an operable cell is shown which can be used to power a device.

Figure 2:
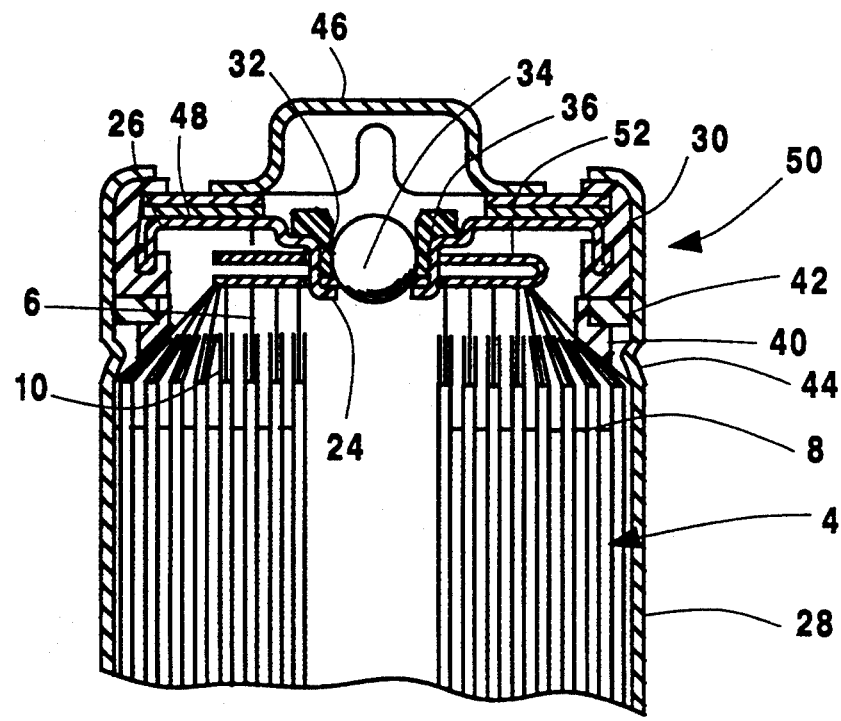
FIG. 2 is a vertical cross-sectional view of the cell in FIG. 1 showing another embodiment of a spring contact means in accordance with this invention.
Figure 6:
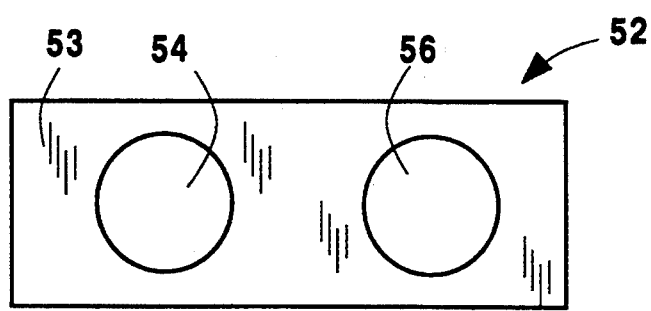
FIG. 6 is a plan view of another embodiment of a conductive elongated member in accordance with this invention.
Figure 7:
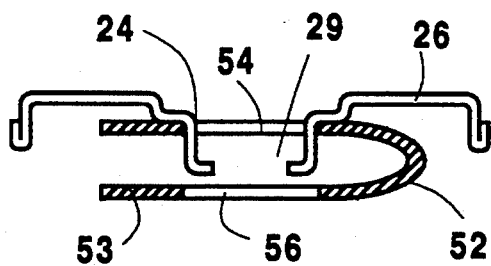
FIG. 7 is a side elevation view, partially in section, of the folded elongated member of FIG. 6 press-fitted over an extended central wall of a cover for a cell.

FIG. 2 shows the same cell as FIG. 1, except that a different conductive spring member is employed. The same reference part numbers have been used in FIGS. 1 and 2 to identify the same parts employed in the cell. As shown in FIGS. 2, 6 and 7, cell 50 employs a conductive spring member 52 comprising a flat member 53 defining two spaced-apart openings 54 and 56. As shown in FIGS. 6 and 7, conductive member 53 is folded so that openings 54 and 56 are aligned and spaced apart. Opening 56 is preferably larger than opening 54. FIG. 7 shows the folded conductive spring member 52 press-fitted onto an external wall 24 of cover 26 and said external wall 24 defining a vent opening 29. As shown in FIGS. 2 and 7, conductive spring member 52 makes physical and electrical contact with cover 26 so that when first electrode strip 6 electrically contacts conductive spring member 52, cover 26 is adapted as the terminal for first electrode strip 6. The spring members 12 and 52 will provide good electrical contact between electrode 6 and cover 26 since the folded spring members 12 and 52 are further compressed when assembled into the cell as can be observed from FIGS. 1 and 5 for spring member 12 and FIGS. 2 and 7 for spring member 52.

If desired, a suitable sealant could be disposed between the liner 36 and wall 24 as disclosed in U.S. Pat. No. 4,592,970. Suitable sealants for use in this invention include asphalt, wax and epoxy. At room temperature (about 20° C.), the cells of this invention can be made to vent at an internal pressure as low as 100 and as high as 1900 psi depending on the size of the cell and the cell system. Generally, a pressure range of 600 to 1100 psi would be suitable for most AA-size cells, such as Li/FeS$_2$ and Li/MnO$_2$ cells.

It is to be understood that although the present invention has been described with reference to particular details thereof, it is not intended that these details shall be construed as limiting the scope of this invention. For example, it has been found that using a longer or extended liner, the seal-vent member (ball) can be further inserted into the vent orifice thereby further increasing the pressure at which the vent will be activated.

What is claimed is:

1. The invention relates to an electrochemical cell comprising:
   (a) an electrode assembly containing a first electrode and a second electrode of opposite polarity;
   (b) a housing containing said electrode assembly and a means for providing a terminal for the first electrode;
   (c) a cover assembly for said housing, said cover assembly comprising a cover member electrically insulated from the housing and containing at least one vent orifice defined by an extended wall of said cover extending into the housing and having a sealing member closing said vent orifice;
   (d) an electrically conductive spring comprising a folded elongated member in which the surface defines at least two openings that are axially aligned and two openings of which are spaced apart to form spring means of the folded elongated member, and the extended wall forming the vent orifice of the cover projected through said openings in the folded conductive spring and making electrical contact with said cover member; and
   (e) one of said first and second electrodes electrically contacting the conductive spring thereby adapting the cover as a terminal for the second electrode.

2. The electrochemical cell of claim 1 wherein the surface of the folded elongated member defines two spaced apart openings which in the folded condition are axially aligned but spaced apart.

3. The electrochemical cell of claim 1 wherein the surface of the folded elongated member defines a center opening, a first side opening and a second side opening in the opposite direction, said first and second side openings folded over the center opening so that the surfaces defining the first and second side openings are in contact and said first and second side openings are axially aligned with and spaced apart from the center opening to form spring means in the folded elongated member.

4. The electrochemical cell of claim 3 wherein the center opening is larger than the first side opening and the second side opening.

5. The electrochemical cell of claim 3 wherein the first and second side openings are disposed at the upper portion of the extended wall of the cover defining the vent opening.

6. The electrochemical cell of claim 1 wherein the spring is made of a material selected from the group consisting of stainless steel, cold rolled steel, nickel-plated stainless steel and nickel-plated cold rolled steel.

7. The electrochemical cell of claim 1 wherein said sealing member is force-fitted within the vent orifice in the cover.

8. The electrochemical cell of claim 7 further including a liner located between the wall of the vent opening in the cover and the sealing member.

9. The electrochemical cell of claim 1 wherein said first electrode and said second electrode are wound in a spiral configuration.

10. The electrochemical cell of claim 1 wherein said electrode assembly comprises an anode selected from the group consisting of aluminum, zinc, alkali metals, alkaline earth metals, alloys of alkali metals, and alloys of alkaline earth metals and alkali metal-intercalated carbon and graphite.

11. The electrochemical cell of claim 1 wherein said electrode assembly includes an anode selected from the group consisting of lithium, sodium, calcium and lithiated carbon.

12. The electrochemical cell of claim 1 wherein said electrode assembly includes a cathode selected from the group consisting of iron sulfides, manganese oxides, carbon fluorides, V$_2$O$_5$, WO$_3$, MoO$_3$, MoS$_3$, lead oxides, cobalt oxides, copper oxides, copper sulfides, In$_2$S$_3$, NiS, Ag$_2$CrO$_4$, Ag$_3$PO$_4$, transition metal sulfides, transition metal polysulfides, lithiated metal oxides and sulfides and mixtures thereof.

13. The electrochemical cell of claim 11 wherein said electrode assembly includes a cathode selected from the group consisting of liquid oxyhalides and sulfur dioxide.

14. The electrochemical cell of claim 12 wherein said electrode assembly includes an anode selected from the group consisting of aluminum, zinc, alkali metals, alkaline earth metals, alloys of alkali metals, alloys of alkaline earth metals and alkali metal-intercalated carbon and graphite.

15. The electrochemical cell of claim 13 wherein the anode is lithium and the cathode is thionyl chloride.

16. The electrochemical cell of claim 12 wherein the anode is lithium and the cathode is FeS$_2$.

17. The electrochemical cell of claim 12 wherein the anode is lithium and the cathode is MnO$_2$.

18. The electrochemical cell of claim 12 wherein the anode is lithium and the cathode is selected from the group consisting of lithium cobalt oxide, lithium nickel cobalt oxide, lithium titanium sulfide, lithium iron sulfide and lithium manganese oxide.

19. The electrochemical cell of claim 1 wherein the first electrode is electrically connected to the housing and a second electrode of opposite polarity is electrically connected to the cover and wherein a positive temperature coefficient device is disposed in the electrical circuit between the conductive cover and the second electrode.

20. The electrochemical cell of claim 19 wherein the first electrode is lithium and the second electrode is selected from the group consisting of FeS$_2$ and MnO$_2$.

21. The electrochemical cell as defined in claim 7, wherein said sealing member is made of a material selected from the group consisting essentially of plastic, metal, glass and ceramic.

22. The electrochemical cell as defined in claim 8, wherein said liner is made from a material selected from the group consisting essentially of nylon, polyethylene, polypropylene, polytetrafluoroethylene, fluorinated ethylene-propylene polymer, perfluoroalkoxy polymer, ethylene-fluorinated ethylene polymer, glasses and metal.

23. The electrochemical cell as defined in claim 21, wherein said sealing member is made of a material selected from the group consisting essentially of polytetrafluoroethylene, fluorinated ethylene-propylene copolymer, perfluoroalkoxyethylene, polypropylene, polycarbonate, and acrylic polymers.

* * * * *